United States Patent
Cabrera et al.

(10) Patent No.: US 9,418,236 B2
(45) Date of Patent: Aug. 16, 2016

(54) METHOD AND SYSTEM FOR DYNAMICALLY AND AUTOMATICALLY MANAGING RESOURCE ACCESS PERMISSIONS

(71) Applicant: Intuit Inc., Mountain View, CA (US)

(72) Inventors: Luis Felipe Cabrera, Bellevue, WA (US); M. Shannon Lietz, San Marcos, CA (US); Brad A. Rambur, Carlsbad, CA (US); Christian Price, San Diego, CA (US); William Q. Bonney, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 4 days.

(21) Appl. No.: 14/078,715

(22) Filed: Nov. 13, 2013

(65) Prior Publication Data

US 2015/0135305 A1     May 14, 2015

(51) Int. Cl.
    *H04L 29/06*     (2006.01)
    *G06F 21/62*     (2013.01)

(52) U.S. Cl.
    CPC .............. *G06F 21/62* (2013.01); *H04L 63/102* (2013.01); *G06F 2221/2141* (2013.01)

(58) Field of Classification Search
    CPC .................... G06F 21/6218; G06F 2221/2141; G06F 221/2149
    USPC .......................................................... 726/17
    See application file for complete search history.

(56) References Cited

U.S. PATENT DOCUMENTS

| | | | |
|---|---|---|---|
| 6,202,066 B1 * | 3/2001 | Barkley et al. ................. | 707/785 |
| 7,228,438 B2 | 6/2007 | Bushmitch et al. | |
| 7,574,746 B2 | 8/2009 | Hill et al. | |
| 7,577,722 B1 | 8/2009 | Khandekar et al. | |
| 7,640,458 B2 | 12/2009 | Rao et al. | |
| 7,779,247 B2 | 8/2010 | Roegner | |
| 7,792,256 B1 | 9/2010 | Arledge et al. | |
| 7,925,923 B1 | 4/2011 | Hyser et al. | |
| 8,132,231 B2 | 3/2012 | Amies et al. | |
| 8,341,625 B2 | 12/2012 | Ferris et al. | |
| 8,347,281 B2 | 1/2013 | Arsenault et al. | |
| 8,639,923 B2 | 1/2014 | Lo et al. | |

(Continued)

FOREIGN PATENT DOCUMENTS

WO    WO 2013/123548    8/2013

OTHER PUBLICATIONS

Gryb et al., "Method and System for Validating a Virtual Asset," U.S. Appl. No. 14/070,050, filed Nov. 1, 2013.

(Continued)

*Primary Examiner* — Jason K Gee
(74) *Attorney, Agent, or Firm* — Hawley Troxell Ennis & Hawley LLP; Philip McKay

(57) ABSTRACT

Employment role data, trust data, and special permissions data, associated with a party is automatically obtained and/or monitored. The employment role data associated with the party, the trust data associated with the party, and the special permissions data associated with the party, is then analyzed to determine a set of allowed access permissions data to be associated with the party, the set of allowed access permissions data providing the party access to one or more resources. It is then either recommended that the set of allowed access permissions data be provided to the party, or the set of allowed access permissions data is automatically provided to the party.

18 Claims, 4 Drawing Sheets

(56) References Cited

U.S. PATENT DOCUMENTS

| | | |
|---|---|---|
| 8,656,482 B1 | 2/2014 | Tosa et al. |
| 8,799,431 B2 | 8/2014 | Pabari |
| 2004/0010571 A1 | 1/2004 | Hutchinson et al. |
| 2005/0108571 A1 | 5/2005 | Lu et al. |
| 2005/0183138 A1 | 8/2005 | Phillips et al. |
| 2006/0101519 A1 | 5/2006 | Lasswell et al. |
| 2006/0248573 A1* | 11/2006 | Pannu et al. ............. 726/1 |
| 2007/0043860 A1 | 2/2007 | Pabari |
| 2007/0101400 A1 | 5/2007 | Freeman et al. |
| 2007/0169204 A1 | 7/2007 | Janakiraman et al. |
| 2007/0250424 A1 | 10/2007 | Kothari |
| 2008/0256639 A1 | 10/2008 | Onoda et al. |
| 2009/0177717 A1 | 7/2009 | Meehan et al. |
| 2010/0076987 A1* | 3/2010 | Schreiner ............. 707/754 |
| 2010/0235828 A1 | 9/2010 | Nishimura et al. |
| 2010/0251363 A1 | 9/2010 | Todorovic |
| 2011/0197065 A1 | 8/2011 | Stauth et al. |
| 2011/0258692 A1 | 10/2011 | Morrison et al. |
| 2012/0151553 A1* | 6/2012 | Burgess et al. ............. 726/1 |
| 2012/0240193 A1 | 9/2012 | Littlefield et al. |
| 2012/0266167 A1 | 10/2012 | Spiers et al. |
| 2012/0291094 A9 | 11/2012 | Forrester et al. |
| 2012/0304300 A1 | 11/2012 | LaBumbard |
| 2012/0324446 A1 | 12/2012 | Fries et al. |
| 2013/0091376 A1 | 4/2013 | Raspudic et al. |
| 2013/0097701 A1* | 4/2013 | Moyle et al. ............. 726/22 |
| 2013/0117567 A1 | 5/2013 | Chang et al. |
| 2013/0247133 A1 | 9/2013 | Price et al. |
| 2013/0247207 A1 | 9/2013 | Hugard et al. |
| 2013/0304693 A1 | 11/2013 | Jaeger et al. |
| 2013/0326580 A1 | 12/2013 | Barclay et al. |
| 2014/0047546 A1 | 2/2014 | Sidagni |
| 2014/0196104 A1* | 7/2014 | Chari et al. ............. 726/1 |
| 2014/0282889 A1 | 9/2014 | Ishaya et al. |

OTHER PUBLICATIONS

Weaver et al., "Method and System for Providing and Dynamically Deploying Hardened Task Specific Virtual Hosts," U.S. Appl. No. 14/070,124, filed Nov. 1, 2013.

Cabrera et al., "Method and System for Providing a Robust and Efficient Virtual Asset Vulnerability Management and Verification Service," U.S. Appl. No. 14/186,801, filed Feb. 21, 2014.

Lietz et al., "Method and System for Providing an Efficient Vulnerability Management and Verification Service," U.S. Appl. No. 14/192,529, filed Feb. 27, 2014.

Lietz et al., "Method and System for Providing Temporary Secure Access Enabled Virtual Assets," U.S. Appl. No. 14/217,653, filed Mar. 18, 2014.

Lietz et al., "Method and System for Providing Self-Monitoring, Self-Reporting, and Self-Repairing Virtual Assets in a Cloud Computing Environment," U.S. Appl. No. 14/256,289, filed Apr. 18, 2014.

Cabrera et al., "Method and System for Providing Automated Self-Healing Virtual Assets," U.S. Appl. No. 14/448,326, filed Jul. 31, 2014.

Lietz et al., "Method and System for Correlating Self-Reporting Virtual Asset Data with External Events to Generate an External Event Identification Database," U.S. Appl. No. 14/448,405, filed Jul. 31, 2014.

Schwarzkopf et al., "Increasing Virtual Machine Security in Cloud Environments," *Journal of Cloud Computing: Advances, Systems and Applications*, Jul. 2012, pp. 1-12.

\* cited by examiner

METHOD AND SYSTEM FOR DYNAMICALLY AND AUTOMATICALLY MANAGING RESOURCE ACCESS PERMISSIONS

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based infrastructures, and/or other distributive computing models. This is because many owners and operators of data centers that provide access to data and other resources are extremely hesitant to allow their data and resources to be accessed, processed, and/or otherwise used, by virtual assets, such as virtual machine and server instances in the cloud.

One issue associated with the use of resources such as virtual assets, and other more traditional assets, is the need to control who is provided access to, and/or control of, the resources. For instance, in order to perform their assigned job or role within an organization, multiple parties within, or associated with, the organization my require access to resources owned by the organization.

As an even more specific example, in a cloud computing environment, an organization, such as an enterprise, may have literally thousands, or even tens of thousands, of resources, such as server instances, data storage instances, or other virtual assets, that are provided by a cloud service provider and are under the control of the organization. In many cases, the access to these resources is controlled by multiple account numbers assigned to the organization and controlling sub-sets of the resources assigned to the organization. The account numbers often are associated with different classes of resources, and/or used for different tasks, and/or with different security issues/levels.

As discussed above, in a cloud computing environment, an organization can control which resources a given party has access to by controlling the account numbers provided to the party. Consequently, by controlling the distribution of account numbers to a party, the organization can control which resources the party can access. In other cases, and in other computing environments, an organization can similarly control which resources a party can access by controlling the distribution of passwords, passphrases, digital certificates, encryption keys, or other secrets. In many cases, sets of allowed secrets are themselves controlled by other access data such as account numbers, access clearance codes, and/or any other access permissions data.

While controlling access to various resources using account numbers, secrets, and other access permissions can be an effective way of controlling a party's access to resources, accurately assigning, monitoring, and updating the permissions data which a given party within an organization should, or should not, be provided is currently a largely manual activity that consumes significant resources, and is often handled in an ad-hoc and inefficient manner. More problematic still is the fact that using current manual methods for assigning, monitoring, and updating the permissions data, there is often no systematic and effective mechanism for monitoring the trustworthiness of a given party and using this information to assign, monitor, and update the permissions data provided to that party. Consequently, using current methods for assigning, monitoring, and updating permissions data, there is significant potential for security gaps, human error, and inefficient and ineffective use of resources.

What is needed is a method and system to automatically obtain, monitor, and analyze the employment role data associated with a party, trust data associated with a party, and special permissions data associated with a party to assign, monitor, and update the permissions data provided to a party, and/or make recommendation regarding the permissions data provided to a party.

SUMMARY

In accordance with one embodiment, a method and system for dynamically and automatically managing resource access permissions includes automatically obtaining and/or monitoring employment role data associated with a party. In one embodiment, the employment role data associated with the party includes data indicating the party's role and/or job description within an organization managing access to resources associated with the organization.

In one embodiment, trust data associated with the party is automatically obtained and/or monitored. In one embodiment, the trust data associated with the party includes data indicating the party's trust related activities and/or a trust level/trust score assigned to the party.

In one embodiment, special permissions data associated with the party is automatically obtained and/or monitored. In one embodiment, the special permissions data associated with the party includes data indicating any special resource access permissions granted to the party.

In one embodiment, the employment role data associated with the party, the trust data associated with the party, and the special permissions data associated with the party, is then analyzed periodically to determine a set of allowed access permissions data to be associated with the party, the set of allowed access permissions data providing the party access to one or more resources. In one embodiment, it is then either recommended that the set of allowed access permissions data be provided to the party, or the set of allowed access permissions data is automatically provided to the party.

Figure 1:
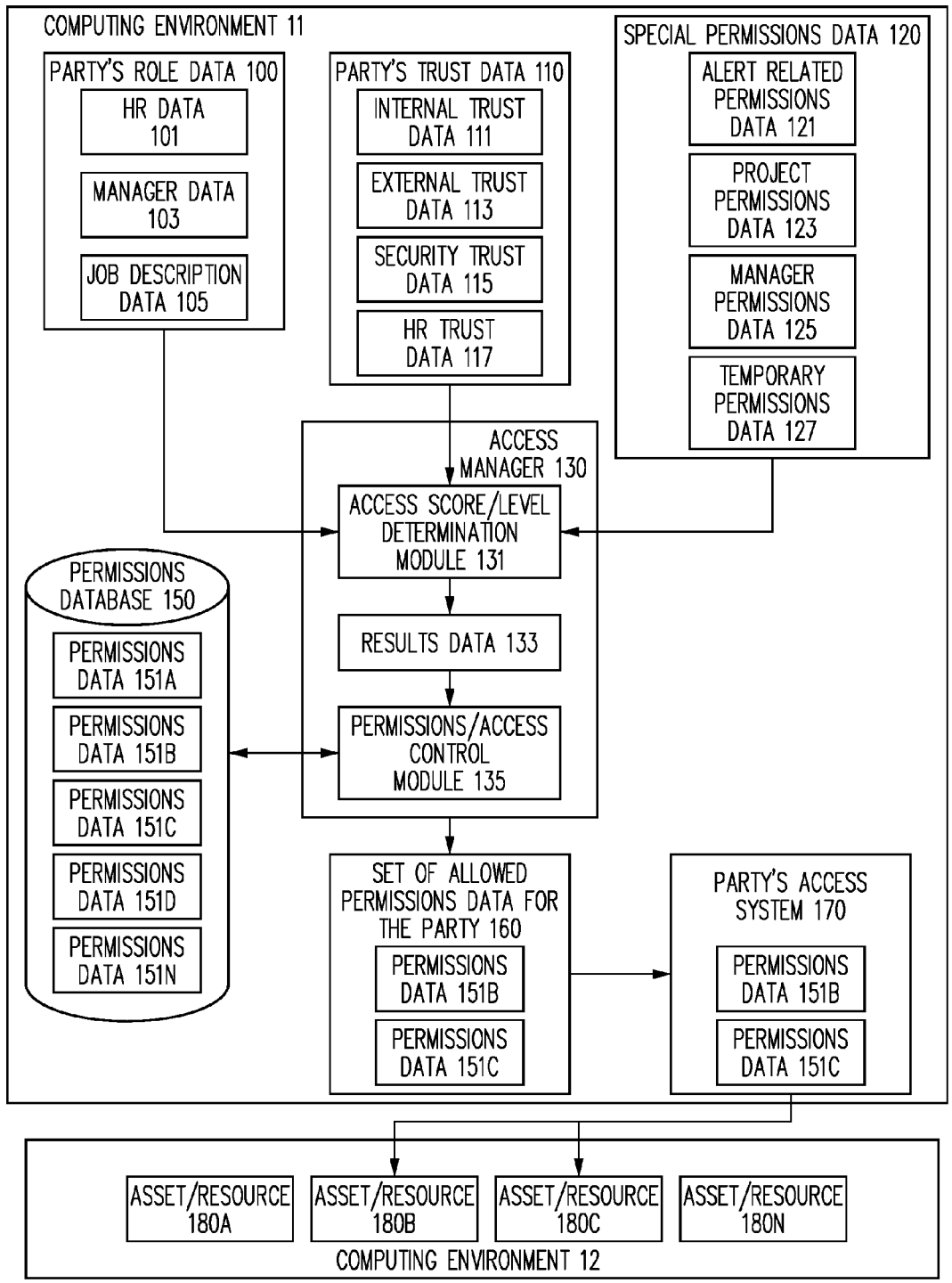
FIG. 1 is a functional block diagram showing the interaction of various elements for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for dynamically and automatically managing resource access permissions includes a process for dynamically and automatically managing resource access permissions implemented, at least in part, by one or more computing systems.

As used herein, the term "computing system", includes, but is not limited to, a server computing system; a workstation; a desktop computing system; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for dynamically and automatically managing resource access permissions are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments, are those where the components, infrastructure, communication and networking systems, and security systems associated with the computing systems making up the trusted computing environment, are either under the control of, or known to, a party. In contrast, unknown, or untrusted computing environments are environments and systems where the components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, a party, and/or any computing systems, and/or networks of computing systems, associated with, known by, and/or controlled by, a party. Examples of untrusted computing environments include, but are not limited to, public networks, such as the Internet, various cloud-based computing environments, and various other forms of distributed computing systems.

It is often the case that a party desires to transfer data to, and from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations, a party may wish to transfer data between two trusted computing environments, and/or two untrusted computing environments.

In one embodiment, two or more computing systems, and/or two or more computing environments, are connected by one or more communications systems, and/or distributed computing system networks, such as, but not limited to: a public cloud; a private cloud; a virtual private cloud (VPN); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

FIG. 1 is a functional diagram of the interaction of various elements associated with one embodiment of the method and system for dynamically and automatically managing resource access permissions discussed herein. Of particular note, the various elements in FIG. 1 are shown for illustrative purposes as being associated with specific computing environments, such as computing environment 11 and computing environment 12. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more computing environments or systems, and/or architectural or infrastructure components, such as one or more hardware systems, one or more software systems, one or more data centers, one or more clouds or cloud types, one or more third party service capabilities, or any other computing environments, architectural, and/or infrastructure components, as discussed herein, and/or as known in the art at the time of filing, and/or as developed/ made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center keeping or accessing the secrets data, a party, and/or entity providing all, or a portion, of a cloud-based computing environment, the owner or a provider of a service, the owner or provider of one or more resources accessible using the secrets, and/or any other party, and/or entity providing one or more functions, and/or any other party, and/or entity, as discussed herein, and/or as known in the art at the time of filing, and/or as made known after the time of filing.

In accordance with one embodiment, employment role data associated with a party including data indicating the party's role and/or job description within an organization managing access to resources associated with the organization is obtained and/or monitored.

In various embodiments, the employment role data associated with the party is obtained from one of various sources within the organization such as, but not limited to, the party's employment record data and data from a human resources department and/or an accounting department associated with the organization.

In some embodiments, the employment role data associated with the party includes data indicating permissions data already granted to the party based on the party's role within the organization. Consequently, in various embodiments, the employment role data associated with the party includes, but is not limited to, job description data indicating the party's job within the organization, and/or initial or default access permissions data required by the job indicated in job description data.

In various embodiments, the employment role data associated with the party includes, but is not limited to, manager access request data indicating resources access the party's manager desires to provide the party. For example, the employment role data associated with the party may indicate the party's manager has previously granted, and/or requested, various permissions data be provided to the party in order for the party to perform specific tasks assigned to the party by the manager.

In various embodiments, the employment role data associated with the party includes, but is not limited to, human resources data and/or employee record data indicating the party's work history with the organization, and/or permissions data previously granted to the party in addition to a listing of permissions data currently granted to the party.

In various embodiments, the employment role data associated with the party includes, but is not limited to, any combination of the employment role data as discussed herein, and/or as known in the art at the time of filing, and/or as becomes known in the art after the time of filing.

Referring to FIG. 1, the employment role data associated with the party is shown as party's role data 100 including human resources data and/or employee record data, represented by HR data 101 in FIG. 1; manager access request data, represented by manager data 103 in FIG. 1; and job description data represented by job description data 105 in FIG. 1. In the specific example shown in FIG. 1, party's role data 100 is shown as residing in computing environment 11.

In various embodiments, the employment role data associated with the party is not only initially obtained, but the employment role data associated with the party is automatically monitored on a periodic and/or continuous basis.

In one embodiment, trust data associated with the party indicating the party's trust related activities and/or a trust level/trust score assigned to the party is obtained and/or monitored.

In various embodiments, the trust data associated with the party includes trust data obtained from several sources including, but not limited to, internal trust data associated with the party obtained by monitoring the party's activities and interaction with resources within, and/or with, the organization; external trust data associated with the party obtained by monitoring the party's activities and interaction with resources outside the organization, and/or associated with third party entities; security trust data associated with the party indicating the party's use and management of secrets data and adherence to security procedures; human resources trust data associated with the party indicating the party's employment and advancement record within the organization; financial trust data associated with the party; and/or any other sources of trust data associated with the party, as discussed herein, and/or as known in the art at the time of filing, and/or as becomes known after the time of filing.

In various embodiments, the internal trust data associated with the party includes, but is not limited to, data indicating the party's history of attempted access to resources for which the party did not have the required permissions. In one embodiment, more than a threshold number of attempts by the party to access resources for which the party does not have permission is considered problematic and therefore can represent a trust issue associated with the party that lowers the trust level/trust score assigned to the party.

In various embodiments, the internal trust data associated with the party includes, but is not limited to, data indicating responsiveness of the party with respect to security and/or data entry requests. In one embodiment, the party's responsiveness, or lack of responsiveness, is considered an indication of the trustworthiness of the party and can affect the trust level/trust score assigned to the party.

In various embodiments, the internal trust data associated with the party includes, but is not limited to, data indicating the party's history of Internet access from the organization's equipment. In one embodiment, the party's use of organizational equipment, such as computing systems, to access the Internet is taken into consideration, including whether the Internet access is deemed to be in connection with the party's role within the organization or of a more personal nature. In various embodiments, a determination that the party is using organizational equipment to access the Internet for personal reasons is considered a potential problem and can affect the trust level/trust score assigned to the party.

In various embodiments, the internal trust data associated with the party includes, but is not limited to, data indicating the party's history of Internet access during the party's working hours. In various embodiments, a determination that the party is accessing the Internet for personal reasons during working hours is considered a potential problem and can affect the trust level/trust score assigned to the party.

In various embodiments, the internal trust data associated with the party includes, but is not limited to, data indicating the party's history of cloud-based resources access using the organization's equipment. In various embodiments, a determination that the party is using organizational equipment to access the cloud for personal reasons is considered a potential problem and can affect the trust level/trust score assigned to the party.

In various embodiments, the internal trust data associated with the party includes, but is not limited to, data indicating the party's history of cloud-based resources access during the party's working hours. In various embodiments, log data indicating the party's use of cloud-based resources is monitored to ensure the party is using the cloud-based resources only for tasks associated with the party's role during working hours.

In various embodiments, the internal trust data associated with the party includes, but is not limited to, data indicating the party's history of cloud-based resources access during the party's non-working hours. In various embodiments, log data indicating the party's use of cloud-based resources is monitored to ensure the party is not accessing the cloud during non-working hours.

In various embodiments, the internal trust data associated with the party includes, but is not limited to, data indicating the party's compliance with one or more employment policies. As an example, in one embodiment, data is obtained indicating whether the party turns off computing systems used by the party at the end of the workday, and/or whether the party complies with various organizational security policies involving the handling of secrets, passwords, etc.

In various embodiments, the external trust data associated with the party includes, but is not limited to, data obtained from one or more external websites associated with the party, and/or data obtained from one or more accounts with one or more social media websites associated with the party.

In various embodiments, as a condition for being provided employment, and/or permissions data, the party is required to provide permission to access, and/or access information related to, various websites, including social media websites, where the party may have a an account, and/or presence. In various embodiments, these external websites are monitored to ensure that the party's activities outside of the workplace are in compliance with the organization's security and employment policies. Any indication from the party's presence on the outside websites that the party is engaging in, or supporting, activities that are contrary to the organization's security and/or employment policies is considered an indication that the party should be assigned a lower trust level/trust score.

In various embodiments, as a condition for being provided employment and/or permissions data, the party is required to provide various information required to access the various external websites. In one embodiment, failure to provide this data, or update this data when it is changed, is considered an indication that the party should be assigned a lower trust level/trust score. In addition, failure to provide the required access data, and/or update the required access data, upon request is also considered an indication that the party should be assigned a lower trust level/trust score. In various embodiments, even when the party fails to provide the required access data, other methods may be employed to obtain the data such as, but not limited to, screen scraping or similar technologies.

In various embodiments, the external trust data associated with the party includes, but is not limited to, data obtained from a web browser used by the party indicating the party's Internet access history and sites accessed by the party using organizational equipment, and/or equipment that is used for organizational access. In various embodiments, data indicating that the party is accessing websites that are considered problematic, and/or contrary to the organization's security and/or employment policy, is considered an indication that the trust level/trust score assigned to the party should be lowered.

In various embodiments, the external trust data associated with the party includes, but is not limited to, historical geographic location data associated with the party. In various embodiments, computing systems, and particularly mobile computing systems, phones, or other devices, associated with the party, and/or as provided to the party by the organization, are used to track the travel and geographic locations associated with a party. In various embodiments, data indicating that the party has traveled to, or frequents, geographic locations associated with businesses and/or organizations that are considered problematic, such as a competitor of the organization's offices, and/or known geographic locations associated with malicious actors, is considered an indication that the trust level/trust score associated with the party should be lowered.

In various embodiments, the external trust data associated with the party includes, but is not limited to, data obtained from one or more phones associated with the party, such as data indicating phone numbers, text messages, and/or emails, sent, and/or received, by the party. In various embodiments, this data is analyzed to determine if the party is in contact with other parties and/or organizations considered problematic, and/or contrary to, the organization's security and/or employment policies.

In various embodiments, the external trust data associated with the party includes, but is not limited to, data obtained from one or more computing systems associated with the party. In various embodiments, this data is analyzed to determine if the party is in contact with other parties and/or organizations considered problematic, and/or contrary to the organization's security and/or employment policies.

In various embodiments, the security trust data associated with the party includes, but is not limited to, data indicating the strength of passwords used by the party. In particular, data indicating the party historically uses passwords and/or passphrases that are considered strong, and/or meet or exceed, the password requirements imposed by the organization is considered an indication that the party deserves a high trust level/trust score. Likewise, data indicating the party historically uses passwords and/or passphrases that are considered weak, and/or do not meet, the password requirements imposed by the organization is considered an indication that the party deserves a lower trust level/trust score.

In various embodiments, the security trust data associated with the party includes, but is not limited to, data indicating how often the party changes/rotates their passwords. In particular, data indicating the employee changes and/or rotates their passwords, passphrases, or other secrets data at least as often as is required by the organization's security policies is considered an indication that the party deserves a higher trust level/trust score. Likewise, data indicating the party does not change and/or rotate their passwords, passphrases, or other secrets data at least as often as is required by the organization's security policies is considered an indication that the party deserves a lower trust level/trust score.

In various embodiments, the security trust data associated with the party includes, but is not limited to, data indicating whether the party's handling of secrets and access data conforms to a security policy of the organization. For instance, in various embodiments, data indicating the party uses different passwords and/or other secrets for different types of access is considered a sign that the party is more trustworthy than data indicating the party uses the same, or substantially similar, passwords and/or other secrets for different types of access.

In various embodiments, the security trust data associated with the party includes, but is not limited to, data indicating the responsiveness of the party to requests for data and/or action by the party with respect to security. In particular, data indicating the party responds to requests for data and/or action in a timely manner is considered an indication that the party deserves a higher trust level/trust score while data indicating the party does not respond to requests for data and/or action in a timely manner is considered an indication that the party is less trustworthy.

In various embodiments, the human resources trust data associated with the party includes, but is not limited to, the length of employment of the party by the organization. In various embodiments, the longer the party has been an employee of, and/or associated with, the organization; the higher the level of trust assigned to the party.

In various embodiments, the human resources trust data associated with the party includes, but is not limited to, data indicating the advancement of the party within the organization as compared with similarly situated parties within the organization. In various embodiments, data indicating the party has not advanced within the organization at the same rate as other similarly situated parties within the organization is considered potentially problematic in that this data could be an indication that the party is not particularly happy in their position. Consequently data indicating the party has not advanced at the same rate as other similarly situated parties can be an indication that the trust level/trust score assigned to the party should be lowered.

In various embodiments, the human resources trust data associated with the party includes, but is not limited to, data reflecting employee review/evaluation data associated with the party. In various embodiments, a poor, or lower than historical, review or evaluation of the party is considered potentially problematic and an indication that the trust level/trust score of the party should be lowered. Likewise, a good, or higher than historical, review or evaluation of the party is considered an indication that the trust level/trust score of the party should be raised.

In various embodiments, the human resources trust data associated with the party includes, but is not limited to, the employment history of the party. In particular, data indicating the party has been employed by competitors of the organization, and/or has been subjected to disciplinary action within the organization, and/or by previous employers, is considered potentially problematic and an indication that the trust level/trust score assigned to the party should be lower.

In various embodiments, the financial trust data associated with the party includes, but is not limited to, financial data associated with the party obtained from public sources. As an example, in various embodiments, the financial trust data associated with the party includes data from public sources such as, but not limited to, bankruptcy and other court records, child-support court records, foreclosure records, and any other public source of financial data associated with the party, as discussed herein, and/or as known in the art at the time of filing, and/or as becomes available after the time of filing.

In various embodiments, the financial trust data associated with the party includes, but is not limited to, financial data associated with the party obtained from private sources. In various embodiments, the financial data associated with the party is obtained by permission of the party from private sources such as, but not limited to, various credit reporting agencies, financial management systems used by the party, tax records associated with the party, and/or any other private source of financial data associated with the party, as discussed herein, and/or as known in the art at the time of filing, and/or as becomes available after the time of filing.

In various embodiments, the financial trust data associated with the party includes, but is not limited to, financial data associated with the party obtained from the party. In various embodiments, the financial data associated with the party is obtained from the party via one or more forms and or questionnaires, and/or verbally, and/or using any other methods for obtaining financial data associated with the party from the party, as discussed herein, and/or as known in the art at the time of filing, and/or as developed after the time of filing.

Referring to FIG. 1, the trust data associated with the party is shown as party's trust data 110 including internal trust data associated with the party, represented internal trust data 111 in FIG. 1; external trust data associated with the party, represented by external trust data 113 in FIG. 1; security trust data associated with the party, represented by security trust data 115 in FIG. 1; and human resources trust data associated with the party, represented by HR trust data 117 in FIG. 1. In the specific example shown in FIG. 1, party's trust data 110 is shown as residing in computing environment 11.

In various embodiments, the trust data associated with the party is not only initially obtained, but the trust data associated with the party is automatically monitored on a periodic and/or continuous basis.

In various embodiments, the special permissions data associated with the party includes special permissions data obtained from several sources. In various embodiments, the special permissions data associated with the party represents permissions that are granted to the party that are outside the scope of the other permissions granted to the party based on the role of the party, and/or the trust level associated with the party. In many cases, the special permissions data indicates special permissions that are granted on a temporary, and/or as needed, basis.

In various embodiments, the special permissions data associated with the party includes, but is not limited to, alert related permissions data. In various embodiments, when a party is provided an alert indicating a condition which the party must attend to, included in the alert is special permissions data providing the party access to the resources required in order to attend to the condition indicated in the alert. In various embodiments, once the condition has been dealt with, the alert related special permissions data is withdrawn.

In various embodiments, the special permissions data associated with the party includes, but is not limited to, project permissions data. In various embodiments, when a party is assigned to a project, the party is provided project permissions data including permissions data required to access the resources associated with the project. In various embodiments, once the project is complete, the project permissions data is withdrawn.

In various embodiments, the special permissions data associated with the party includes, but is not limited to, manager permissions data. In various embodiments, a manager of the party may grant the party manager permissions data including permissions data for accessing resources which the manager has determined the party needs.

In various embodiments, the special permissions data associated with the party includes, but is not limited to, any temporary permissions data. In various embodiments, temporary permissions data is granted as needed to provide the party access to resources on a temporary basis as determined by the organization, and/or the party's manager.

Referring to FIG. 1, special permissions data associated with the party is shown as special permissions data 120 including alert related permissions data 121; project permissions data 123; manager permissions data 125; and temporary permissions data 127. In the specific example shown in FIG. 1, special permissions data 120 is shown as residing in computing environment 11.

In one embodiment, the employment role data associated with the party, the trust data associated with the party, and the special permissions data associated with the party, are automatically analyzed to determine a set of allowed access permissions data to be associated with the party, the set of allowed access permissions data providing the party access to one or more resources.

In one embodiment, the employment role data associated with the party, the trust data associated with the party, and the special permissions data associated with the party, is analyzed to determine a set of allowed access permissions data to be associated with the party at regularly scheduled time intervals. For instance, in various embodiments, the employment role data associated with the party, the trust data associated with the party, and the special permissions data associated with the party, is analyzed to determine a set of allowed access permissions data to be associated with the party on a weekly, monthly, quarterly, or annual basis, and/or at any other time interval defined and/or desired.

In one embodiment, the employment role data associated with the party, the trust data associated with the party, and the special permissions data associated with the party, is analyzed to determine a set of allowed access permissions data to be associated with the party after each evaluation and/or review of the party, and/or upon the transfer of the party, and/or upon promotion or demotion of the party.

In one embodiment, the employment role data associated with the party, the trust data associated with the party, and the special permissions data associated with the party, is analyzed to determine a set of allowed access permissions data to be associated with the party whenever there is a threshold change in any of the employment role data, trust data, and/or special permissions data, associated with the party.

Referring to FIG. 1, party's role data 100, party's trust data 110, and special permissions data 120 are provided as input data to access manager 130 and access source/level determination module 131.

In one embodiment, at access source/level determination module 131 party's role data 100, party's trust data 110, and special permissions data 120 are processed, and/or subjected to one or more algorithms, to generate results data 133.

In one embodiment, based on the results of the analysis of the employment role data associated with the party, the trust data associated with the party, and the special permissions data associated with the party, a set of allowed access permissions data for the party to be associated with the party is obtained/retrieved.

In various embodiments, the set of allowed access permissions data for the party includes data providing the party with access to one or more resources.

Herein, the term "resource" refers to any software or hardware entity or component. As one specific illustrative example, in one embodiment, the term resources includes any virtual asset implemented in a cloud computing environment.

As used herein, the term "virtual asset" includes any virtualized entity or resource, and/or a part of an actual, or "bare metal" entity. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and/or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In other embodiments, a resource can include one or more components or systems deployed in a data center; one or more physical or virtual server computing systems; one or more physical or virtual workstations; one or more database systems or storage clusters; one or more switching systems; one or more routers; any hardware system; any communications systems; any form of proxy system; one or more gateway systems; one or more firewall systems; one or more load balancing systems; one or more applications and/or services; and/or any other software or hardware entity, or entities, capable of transmitting and/or receiving data as discussed herein, and/or as known in the art at the time of filing, and/or as developed/made available after the time of filing.

In various embodiments, the set of allowed access permissions data for the party includes one or more account numbers which, in turn, provide access to one or more resources.

In various embodiments, the set of allowed access permissions data for the party includes one or more account numbers which, in turn, provide access to one or more virtual assets and/or other resources within a cloud computing environment.

In various embodiments, the set of allowed access permissions data for the party includes one or more account numbers which, in turn, provide the party the capability to instantiate, and/or boot-up, one or more instances and/or other virtual assets in a cloud computing environment.

In various embodiments, the set of allowed access permissions data for the party includes secrets data required to access one or more resources.

As used herein, the term "secrets" includes any information, credentials, or other devices, necessary to protect, encrypt, and/or access, data, one or more resources, one or more virtual assets, and/or one or more computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to protect and control access to various systems, resources, file systems and any other persistent storage, and data, and that are required for such access, as discussed herein, and/or as known/available in the art at the time of filing, and/or as developed/made available after the time of filing.

In one embodiment, the secrets represented by the secrets data are of one or more types, or classifications, of secrets. In various embodiments, the secrets are classified according to the type of resource the secret is used to access. For example, usernames, passwords, and passphrases, necessary to access various applications would be classified as user account access secrets, while digital certificates associated with Secure Socket Layer (SSL) communications channels would be classified as communication secrets, and encryption keys would be classified as encryption secrets.

In addition, the secrets represented by the secrets data can be classified according to the level of security provided by the secrets. For instance encryption keys would be classified as secrets providing a relatively high level of security, with longer encryption keys being classified as secrets providing a higher level of security, while passwords might be classified as secrets providing a relatively moderate level of security, with longer and more diverse passwords being classified as secrets providing a relatively higher level of security.

In addition, the secrets represented by the secrets data can be classified according to whether the secrets provide access to internal resources, such as databases and data in a data center, or access to external resources such as services offered through a cloud or the Internet.

In one embodiment, the different types of secrets are provided by, and/or originate from, different secret sources. In one embodiment, the secrets data representing the different classes of secrets are maintained, at least initially, in separate secret databases, systems, or data stores, and/or in a master secrets database.

Referring to FIG. 1, results data 133 is provided to permissions/access control module 135. As seen in FIG. 1, permissions/access control module 135 is provided access to permissions database 150 which includes various forms of permissions data represented as permissions data 151A, permissions data 151B, permissions data 151C, permissions data 151D, through permissions data 151N. As seen in FIG. 1, permissions/access control module 135 then obtains/retrieves a set of allowed access permissions data for the party, shown as set of allowed permissions data for the party 160.

In one embodiment, once the set of allowed access permissions data for the party is obtained/retrieved, a recommendation is made to one or more authorities within the organization to provide the set of allowed access permissions data for the party to the party, e.g., to an access system, and/or account, associated with the party. In one embodiment, pending approval from the one or more authorities within organization, the set of allowed access permissions data for the party is provided to the party, e.g., is provided to an access system, and/or account, associated with the party.

In another, more automated, embodiment, once the set of allowed access permissions data for the party is obtained/retrieved, the set of allowed access permissions data for the party is automatically provided to the party, e.g., is provided to an access system, and/or account, associated with the party, without any further approval or input.

Referring to FIG. 1, once permissions/access control module 135 obtains/retrieves set of allowed permissions for the party data 160, including, in this specific illustrative example, permissions data 151B and permissions data 151C, permissions data 151B and permissions data 151C are provided to party's access system 170 which, in turn, uses permissions data 151B and permissions data 151C to access asset/resources 180B and asset/resource 180C of the set of types of assets/resources including asset/resource 180A, asset/resource 180B, asset/resource 180C, through asset/resource 180N. In the specific illustrative example of FIG. 1, the set of types of assets/resources including asset/resource 180A, asset/resource 180B, and asset/resource 180C, through asset/resource 180N is shown as residing in computing environment 12.

In another, more automated, embodiment, if the party requests access to a resource for which the party does not currently have the required permissions data, the employment role data associated with the party, the trust data associated with the party, and the special permissions data associated with the party, are automatically analyzed to determine if the party should be provided the required permissions data, and if a determination is made that the party should be provided the required permissions data, the party is automatically provided the required permissions data. In various embodiments, this analysis and provision of permissions data is based on the historical "track record" of the party with respect to the organization and represents a level of automation requiring little or no organizational input beyond establishing the initial operating parameters.

Using the method and system for dynamically and automatically managing resource access permissions discussed above, employment role data associated with a party, trust data associated with a party, and special permissions data associated with a party, is obtained and analyzed to determine a set of allowed access permissions data for a party in a highly automated, efficient, and consistent manner so there is less opportunity for security gaps, human error, and inefficient and ineffective use of resources.

In accordance with one embodiment, employment role data associated with a party including data indicating the party's role and/or job description within an organization managing access to resources associated with the organization is obtained and/or monitored.

In various embodiments, the employment role data associated with the party includes any employment role data associated with a party, as discussed herein, and/or as known in the art at the time of filing, and/or as becomes known after the time of filing.

In various embodiments, the employment role data associated with the party is not only initially obtained, but the employment role data associated with the party is automatically monitored on a periodic and/or continuous basis.

In one embodiment, trust data associated with the party indicating the party's trust related activities and/or a trust level/trust score assigned to the party is obtained and/or monitored.

In various embodiments, the trust data associated with the party includes any trust data associated with the party as discussed herein, and/or as known in the art at the time of filing, and/or as becomes known after the time of filing.

In various embodiments, the trust data associated with the party is not only initially obtained, but the trust data associated with the party is automatically monitored on a periodic and/or continuous basis.

In one embodiment, special permissions data associated with the party indicating any special resource access permissions granted to the party is obtained and/or monitored.

In various embodiments, special permissions data associated with the party includes any special permissions data associated with the party as discussed herein, and/or as known in the art at the time of filing, and/or as becomes known after the time of filing.

In one embodiment, the employment role data associated with the party, the trust data associated with the party, and the special permissions data associated with the party, are automatically analyzed to determine a set of allowed account numbers to be associated with the party, the set of allowed account numbers for the party providing the party access to one or more resources in a cloud computing environment.

In one embodiment, the employment role data associated with the party, the trust data associated with the party, and the special permissions data associated with the party, is analyzed to determine a set of allowed account numbers to be associated with the party at regularly scheduled time intervals. For instance, in various embodiments, the employment role data associated with the party, the trust data associated with the party, and the special permissions data associated with the party, is analyzed to determine a set of allowed account numbers to be associated with the party on a weekly, monthly, quarterly, or annual basis, and/or at any other time interval defined and/or desired.

In one embodiment, the employment role data associated with the party, the trust data associated with the party, and the special permissions data associated with the party, is analyzed to determine a set of allowed account numbers to be associated with the party after each evaluation and/or review of the party, and/or upon the transfer of the party, and/or upon promotion or demotion of the party.

In one embodiment, the employment role data associated with the party, the trust data associated with the party, and the special permissions data associated with the party, is analyzed to determine a set of allowed account numbers to be associated with the party whenever there is a threshold change in any of the employment role data, trust data, and/or special permissions data, associated with the party.

In one embodiment, based on the results of the analysis of the employment role data associated with the party, the trust data associated with the party, and the special permissions data associated with the party, a set of allowed account numbers for the party to be associated with the party is obtained/retrieved.

In various embodiments, the set of allowed account numbers for the party provides the party with access to one or more resources, such as any resource discussed herein, and/or as known in the art at the time of filing, and/or as becomes known after the time of filing.

In other embodiments, a resource can include one or more components or systems deployed in a data center; one or more physical or virtual server computing systems; one or more physical or virtual workstations; one or more database systems or storage clusters; one or more switching systems; one or more routers; any hardware system; any communications systems; any form of proxy system; one or more gateway systems; one or more firewall systems; one or more load balancing systems; one or more applications and/or services; and/or any other software or hardware entity, or entities, capable of transmitting and/or receiving data as discussed herein, and/or as known in the art at the time of filing, and/or as developed/made available after the time of filing.

In various embodiments, the set of allowed account numbers for the party includes one or more account numbers which, in turn, provide access to one or more virtual assets and/or other resources within a cloud computing environment.

In various embodiments, the set of allowed account numbers for the party includes one or more account numbers which, in turn, provide the party the capability to instantiate, and/or boot-up, one or more instances and/or other virtual assets in a cloud computing environment.

In one embodiment, once the set of allowed account numbers for the party is obtained/retrieved, a recommendation is made to one or more authorities within the organization to provide the set of allowed account numbers for the party to the party, e.g., to an access system, and/or account, associated with the party. In one embodiment, pending approval from the one or more authorities within organization, the set of allowed account numbers for the party is provided to the party, e.g., is provided to an access system, and/or account, associated with the party.

In another, more automated, embodiment, once the set of allowed account numbers for the party is obtained/retrieved, the set of allowed account numbers for the party is automatically provided to the party, e.g., is provided to an access system, and/or account, associated with the party, without any further approval or input.

In another, more automated, embodiment, if the party requests access to a resource for which the party does not currently have the required account numbers, the employment role data associated with the party, the trust data associated with the party, and the special permissions data associated with the party, are automatically analyzed to determine if the party should be provided the required account numbers, and if a determination is made that the party should be provided the required account numbers, the party is automatically provided the required account numbers. In various embodiments, this analysis and provision of account numbers is based on the historical "track record" of the party with respect to the organization and represents a level of automation requiring little or no organizational input beyond establishing the initial operating parameters.

Using the method and system for dynamically and automatically managing resource access permissions discussed above, employment role data associated with a party, trust data associated with a party, and special permissions data associated with a party, is obtained and analyzed to determine a set of allowed account numbers for a party in a highly automated, efficient, and consistent manner so there is less opportunity for security gaps, human error, and inefficient and ineffective use of resources.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a process for dynamically and automatically managing resource access permissions includes automatically obtaining and/or monitoring employment role data associated with a party. In one embodiment, the employment role data associated with the party includes data indicating the party's role and/or job description within an organization managing access to resources associated with the organization.

In one embodiment, trust data associated with the party is automatically obtained and/or monitored. In one embodiment, the trust data associated with the party includes data indicating the party's trust related activities and/or a trust level/trust score assigned to the party.

In one embodiment, special permissions data associated with the party is automatically obtained and/or monitored. In one embodiment, the special permissions data associated with the party includes data indicating any special resource access permissions granted to the party.

In one embodiment, the employment role data associated with the party, the trust data associated with the party, and the special permissions data associated with the party, is then analyzed periodically to determine a set of allowed access permissions data to be associated with the party, the set of allowed access permissions data providing the party access to one or more resources. In one embodiment, it is then either recommended that the set of allowed access permissions data be provided to the party, or the set of allowed access permissions data is automatically provided to the party.

Figure 2:
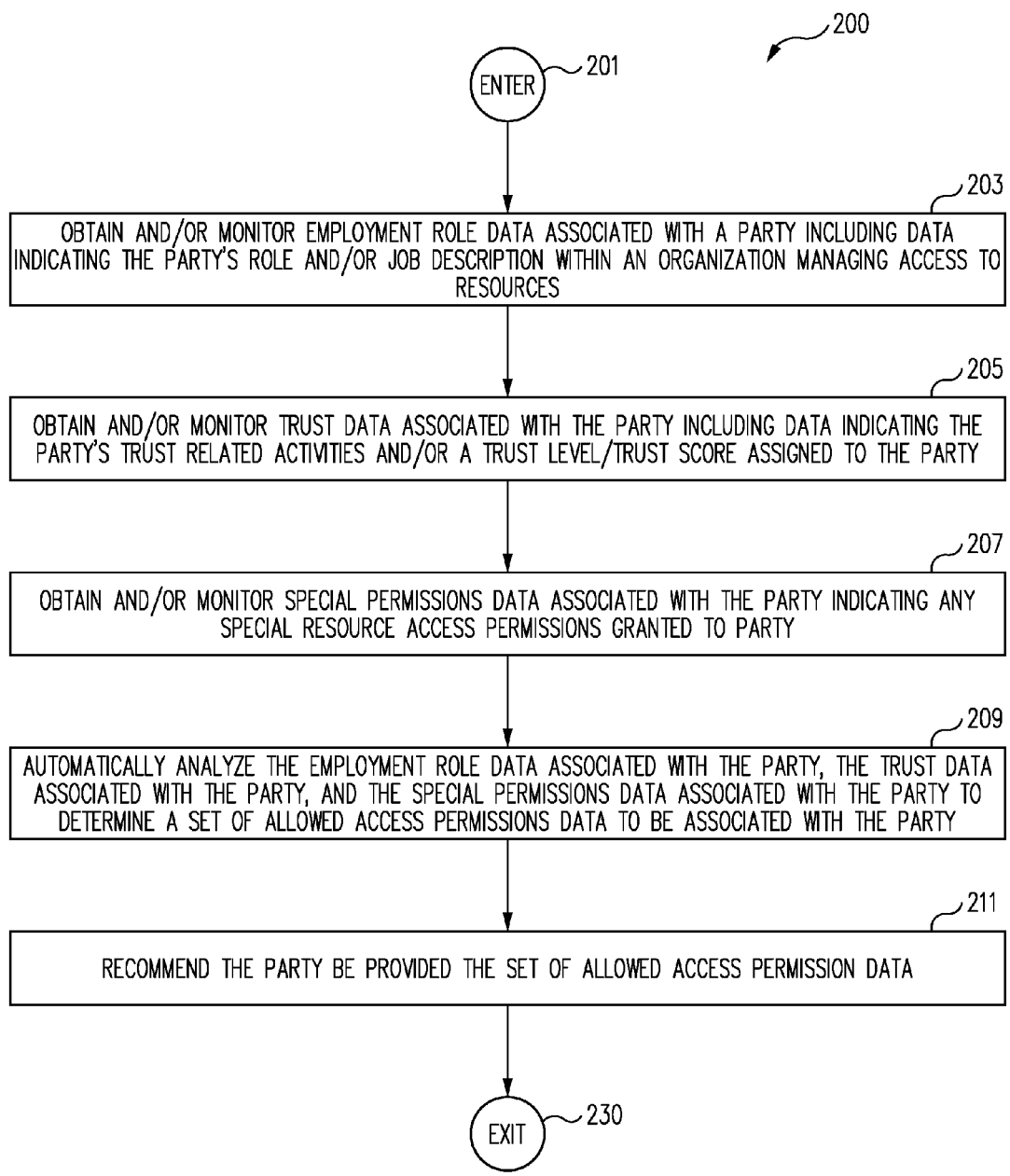
FIG. 2 is a flow chart depicting a process for dynamically and automatically managing resource access permissions in accordance with one embodiment.

FIG. 2 is a flow chart of a process 200 for dynamically and automatically managing resource access permissions in accordance with one embodiment. In one embodiment, process 200 for dynamically and automatically managing resource access permissions begins at ENTER OPERATION 201 of FIG. 2 and process flow proceeds to OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203.

In one embodiment, at OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGA- NIZATION MANAGING ACCESS TO RESOURCES OPERATION 203, employment role data associated with a party including data indicating the party's role and/or job description within an organization managing access to resources associated with the organization is obtained and/or monitored.

In various embodiments, the employment role data associated with the party is obtained at OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203 from one or more sources within the organization such as, but not limited to, the party's employment record data, and/or data from a human resources department associated with the organization, and/or an accounting department associated with the organization.

In some embodiments, the employment role data associated with the party of OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203 includes data indicating permissions data already granted to the party based on the party's role within the organization. Consequently, in various embodiments, the employment role data associated with the party of OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203 includes, but is not limited to, job description data indicating the party's job within the organization, and/or initial or default access permissions data required by the job indicated in job description data.

In various embodiments, the employment role data associated with the party of OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203 includes, but is not limited to, manager access request data indicating resources access the party's manager desires to provide the party. For example, the employment role data associated with the party of OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203 may indicate the party's manager has previously granted, and/or requested, various permissions data be provided to the party in order for the party to perform specific tasks assigned to the party by the manager.

In various embodiments, the employment role data associated with the party of OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203 includes, but is not limited to, human resources data and/or employee record data indicating the party's work history with the organization, and/or permissions data previously granted to the party in addition to a listing of permissions data currently granted to the party.

In various embodiments, the employment role data associated with the party of OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203 includes, but is not limited to, any combination of the employment role data as discussed herein, and/or as known in the art at the time of filing, and/or as becomes known in the art after the time of filing.

In various embodiments, the employment role data associated with the party is not only initially obtained at OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203, but the employment role data associated with the party is automatically monitored on a periodic and/or continuous basis at OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203.

In one embodiment, once employment role data associated with a party including data indicating the party's role and/or job description within the organization managing access to resources associated with the organization is obtained and/or monitored at OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203, process flow proceeds to OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205.

In one embodiment, at OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 trust data associated with the party indicating the party's trust related activities and/or a trust level/trust score assigned to the party is obtained and/or monitored.

In various embodiments, the trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes trust data obtained from several sources including, but not limited to, internal trust data associated with the party obtained by monitoring the party's activities and interaction with resources within, and/or with, the organization; external trust data associated with the party obtained by monitoring the party's activities and interaction with resources outside the organization, and/or associated with third party entities; security trust data associated with the party indicating the party's use and management of secrets data and adherence to security procedures; human resources trust data associated with the party indicating the party's employment and advancement record within the organization; financial trust data associated with the party; and/or any other sources of trust data associated with the party, as discussed herein, and/or as known in the art at the time of filing, and/or as becomes known after the time of filing.

In various embodiments, the internal trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating the party's history of attempted access to resources for which the party did not have the required permissions. In one embodiment, more than a threshold number of attempts by the party to access resources for which the party does not have permission is considered problematic and therefore can represent a trust issue associated with the party that lowers the trust level/trust score assigned to the party.

In various embodiments, the internal trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating responsiveness of the party with respect to security and/or data entry requests. In one embodiment, the party's responsiveness, or lack of responsiveness, is considered an indication of the trustworthiness of the party and can affect the trust level/trust score assigned to the party.

In various embodiments, the internal trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating the party's history of Internet access from the organization's equipment. In one embodiment, the party's use of organizational equipment, such as computing systems, to access the Internet is taken into consideration, including whether the Internet access is deemed to be in connection with the party's role within the organization or of a more personal nature. In various embodiments, a determination that the party is using organizational equipment to access the Internet for personal reasons is considered a potential problem and can affect the trust level/trust score assigned to the party.

In various embodiments, the internal trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating the party's history of Internet access during the party's working hours. In various embodiments, a determination that the party is accessing the Internet for personal reasons during working hours is considered a potential problem and can affect the trust level/trust score assigned to the party.

In various embodiments, the internal trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating the party's history of cloud-based resources access using the organization's equipment. In various embodiments, a determination that the party is using organizational equipment to access the cloud for personal reasons is considered a potential problem and can affect the trust level/trust score assigned to the party.

In various embodiments, the internal trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating the party's history of cloud-based resources access during the party's working hours. In various embodiments, log data indicating the party's use of cloud-based resources is monitored to ensure the party is using the cloud-based resources only for tasks associated with the party's role during working hours.

In various embodiments, the internal trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating the party's history of cloud-based resources access during the party's non-working hours. In various embodiments, log data indicating the party's use of cloud-based resources is monitored to ensure the party is not accessing the cloud during non-working hours.

In various embodiments, the internal trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating the party's compliance with one or more employment policies. As an example, in one embodiment, data is obtained indicating whether the party turns off computing systems used by the party at the end of the workday, and/or whether the party complies with various organizational security policies involving the handling of secrets, passwords, etc.

In various embodiments, the external trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data obtained from one or more external websites associated with the party, and/or data obtained from one or more accounts with one or more social media websites associated with the party.

In various embodiments, as a condition for being provided employment, and/or permissions data, the party is required to provide permission to access, and/or access information related to, various websites, including social media websites, where the party may have a an account, and/or presence. In various embodiments, these external websites are monitored at OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 to ensure that the party's activities outside of the workplace are in compliance with the organization's security and employment policies. Any indication from the party's presence on the outside websites that the party is engaging in, or supporting, activities that are contrary to the organization's security and/or employment policies is considered an indication that the party should be assigned a lower trust level/trust score.

In various embodiments, as a condition for being provided employment, and/or permissions data, the party is required to provide various information required to access the various external websites. In one embodiment, failure to provide this data, or update this data when it is changed, is considered an indication that the party should be assigned a lower trust level/trust score. In addition, failure to provide the required access data, and/or update the required access data, upon request is also considered an indication that the party should be assigned a lower trust level/trust score.

In various embodiments, even when the party fails to provide the required access data, other methods may be employed to obtain the data at OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 such as, but not limited to, screen scraping or similar technologies.

In various embodiments, the external trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data obtained from a web browser used by the party indicating the party's Internet access history and sites accessed by the party using organizational equipment, and/or equipment that is used for organizational access. In various embodiments, data indicating that the party is accessing websites that are considered problematic, and/or contrary to the organization's security and/or employment policy, is considered an indication that the trust level/trust score assigned to the party should be lowered.

In various embodiments, the external trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, historical geographic location data associated with the party. In various embodiments, computing systems, and particularly mobile computing systems, phones, or other devices, associated with the party, and/or as provided to the party by the organization, are used to track the travel and geographic locations associated with a party.

In various embodiments, at OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 data indicating that the party has traveled to, or frequents, geographic locations associated with businesses and/or organizations that are considered problematic, such as a competitor of the organization's offices, and/or known geographic locations associated with malicious actors, is considered an indication that the trust level/trust score associated with the party should be lowered.

In various embodiments, the external trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data obtained from one or more phones associated with the party, such as data indicating phone numbers, text messages, and/or emails, sent, and/or received, by the party. In various embodiments, this data is analyzed at OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 to determine if the party is in contact with other parties and/or organizations considered problematic, and/or contrary to, the organization's security and/or employment policies.

In various embodiments, the external trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data obtained from one or more computing systems associated with the party. In various embodiments, this data is analyzed at OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 to determine if the party is in contact with other parties and/or organizations considered problematic, and/or contrary to the organization's security and/or employment policies.

In various embodiments, the security trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating the strength of passwords used by the party. In particular, data indicating the party historically uses passwords and/or passphrases that are considered strong, and/or meet or exceed, the password requirements imposed by the organization is considered an indication that the party deserves a high trust level/trust score. Likewise, data indicating the party historically uses passwords and/or passphrases that are considered weak, and/or do not meet, the password requirements imposed by the organization is considered an indication that the party deserves a lower trust level/trust score.

In various embodiments, the security trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating how often the party changes/rotates their passwords. In particular, data indicating the employee changes and/or rotates their passwords, passphrases, or other secrets data at least as often as is required by the organization's security policies is considered an indication that the party deserves a higher trust level/trust score. Likewise, data indicating the party does not change and/or rotate their passwords, passphrases, or other secrets data at least as often as is required by the organization's security policies is considered an indication that the party deserves a lower trust level/trust score.

In various embodiments, the security trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating whether the party's handling of secrets and access data conforms to a security policy of the organization. For instance, in various embodiments, data indicating the party uses different passwords and/or other secrets for different types of access is considered a sign that the party is more trustworthy than data indicating the party uses the same, or substantially similar, passwords and/or other secrets for different types of access.

In various embodiments, the security trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating the responsiveness of the party to requests for data and/or action by the party with respect to security. In particular, data indicating the party responds to requests for data and/or action in a timely manner is considered an indication that the party deserves a higher trust level/trust score while data indicating the party does not respond to requests for data and/or action in a timely manner is considered an indication that the party is less trustworthy.

In various embodiments, the human resources trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, the length of employment of the party by the organization. In various embodiments, the longer the party has been an employee of, and/or associated with, the organization; the higher the level of trust assigned to the party.

In various embodiments, the human resources trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data indicating the advancement of the party within the organization as compared with similarly situated parties within the organization. In various embodiments, data indicating the party has not advanced within the organization at the same rate as other similarly situated parties within the organization is considered potentially problematic in that this data could be an indication that the party is not particularly happy in their position. Consequently data indicating the party has not advanced at the same rate as other similarly situated parties can be an indication that the trust level/trust score assigned to the party should be lowered.

In various embodiments, the human resources trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, data reflecting employee review/evaluation data associated with the party. In various embodiments, a poor, or lower than historical, review or evaluation of the party is considered potentially problematic and an indication that the trust level/trust score of the party should be lowered. Likewise, a good, or higher than historical, review or evaluation of the party is considered an indication that the trust level/trust score of the party should be raised.

In various embodiments, the human resources trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, the employment history of the party. In particular, data indicating the party has been employed by competitors of the organization, and/or has been subjected to disciplinary action within the organization, and/or by previous employers, is considered potentially problematic and an indication that the trust level/trust score assigned to the party should be lower.

In various embodiments, the financial trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, financial data associated with the party obtained from public sources. As an example, in various embodiments, the financial trust data associated with the party includes data from public sources such as, but not limited to, bankruptcy and other court records, child-support court records, foreclosure records, and any other public source of financial data associated with the party, as discussed herein, and/or as known in the art at the time of filing, and/or as becomes available after the time of filing.

In various embodiments, the financial trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, financial data associated with the party obtained from private sources. In various embodiments, the financial data associated with the party is obtained by permission of the party from private sources such as, but not limited to, various credit reporting agencies, financial management systems used by the party, tax records associated with the party, and/or any other private source of financial data associated with the party, as discussed herein, and/or as known in the art at the time of filing, and/or as becomes available after the time of filing.

In various embodiments, the financial trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205 includes, but is not limited to, financial data associated with the party obtained from the party. In various embodiments, the financial data associated with the party is obtained from the party via one or more forms and or questionnaires, and/or verbally, and/or using any other methods for obtaining financial data associated with the party from the party, as discussed herein, and/or as known in the art at the time of filing, and/or as developed after the time of filing.

In various embodiments, the trust data associated with the party is not only initially obtained at OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205, but the trust data associated with the party is automatically monitored on a periodic and/or continuous basis at OBTAIN AND/OR MONITOR TRUST DATA ASSOCIATED WITH THE PARTY INCLUDING DATA INDICATING THE PARTY'S TRUST RELATED ACTIVI-

TIES AND/OR A TRUST LEVEL/TRUST SCORE ASSIGNED TO THE PARTY OPERATION 205.

In one embodiment, once trust data associated with the party indicating the party's trust related activities and/or a trust level/trust score assigned to the party is obtained and/or monitored at OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205, process flow proceeds to OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 207.

In one embodiment, at OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 207 special permissions data associated with the party is obtained and/or monitored.

In one embodiment, the special permissions data associated with the party of OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 207 represents permissions that are granted to the party that are outside the scope of the other permissions granted to the party based on the role of the party, and/or the trust level associated with the party. In many cases, the special permissions data indicates special permissions that are granted on a temporary, and/or as needed, basis.

In one embodiment, the special permissions data associated with the party of OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 207 includes, but is not limited to, alert related permissions data. In various embodiments, when a party is provided an alert indicating a condition which the party must attend to, included in the alert is special permissions data providing the party access to the resources required in order to attend to the condition indicated in the alert. In various embodiments, once the condition has been dealt with, the alert related special permissions data is withdrawn.

In various embodiments, the special permissions data associated with the party of OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 207 includes, but is not limited to, project permissions data. In various embodiments, when a party is assigned to a project, the party is provided project permissions data including permissions data required to access the resources associated with the project. In various embodiments, once the project is complete, the project permissions data is withdrawn.

In various embodiments, the special permissions data associated with the party of OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 207 includes, but is not limited to, manager permissions data. In various embodiments, a manager of the party may grant the party manager permissions data including permissions data for accessing resources which the manager has determined the party needs.

In various embodiments, the special permissions data associated with the party of OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 207 includes, but is not limited to, any temporary permissions data. In various embodiments, temporary permissions data is granted as needed to provide the party access to resources on a temporary basis as determined by the organization, and/or the party's manager.

In one embodiment, once special permissions data associated with the party is obtained and/or monitored at OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 207, process flow proceeds to AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209.

In one embodiment, at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209 the employment role data associated with the party of OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203, the trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205, and the special permissions data associated with the party of OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 207, are automatically analyzed to determine a set of allowed access permissions data to be associated with the party, the set of allowed access permissions data providing the party access to one or more resources.

In one embodiment, the employment role data associated with the party, the trust data associated with the party, and the special permissions data associated with the party, is analyzed to determine a set of allowed access permissions data to be associated with the party at regularly scheduled time intervals at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209.

For instance, in various embodiments, the employment role data associated with the party, the trust data associated with the party, and the special permissions data associated with the party, is analyzed at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209 to determine a set of allowed access permissions data to be associated with the party on a weekly, monthly, quarterly, or annual basis, and/or at any other time interval defined and/or desired.

In one embodiment, the employment role data associated with the party, the trust data associated with the party, and the special permissions data associated with the party, is analyzed at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209 to determine a set of allowed access permissions data to be associated with the party after each evaluation and/or review of the party, and/or upon the transfer of the party, and/or upon promotion or demotion of the party.

In one embodiment, the employment role data associated with the party, the trust data associated with the party, and the special permissions data associated with the party, is analyzed at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209 to determine a set of allowed access permissions data to be associated with the party whenever there is a threshold change in any of the employment role data, trust data, and/or special permissions data, associated with the party.

In one embodiment, based on the results of the analysis of the employment role data associated with the party, the trust data associated with the party, and the special permissions data associated with the party, of AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209 a set of allowed access permissions data for the party to be associated with the party is obtained/retrieved.

In various embodiments, the set of allowed access permissions data for the party of AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209 includes data providing the party with access to one or more resources.

As noted above, herein, the term "resource" refers to any software or hardware entity or component. As one specific illustrative example, in one embodiment, the term resources includes any virtual asset implemented in a cloud computing environment.

As used herein, the term "virtual asset" includes any virtualized entity or resource, and/or a part of an actual, or "bare metal" entity. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In other embodiments, a resource can include one or more components or systems deployed in a data center; one or more physical or virtual server computing systems; one or more physical or virtual workstations; one or more database systems or storage clusters; one or more switching systems; one or more routers; any hardware system; any communications systems; any form of proxy system; one or more gateway systems; one or more firewall systems; one or more load balancing systems; one or more applications and/or services; and/or any other software or hardware entity, or entities, capable of transmitting and/or receiving data as discussed herein, and/or as known in the art at the time of filing, and/or as developed/made available after the time of filing.

In various embodiments, the set of allowed access permissions data for the party of AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209 includes one or more account numbers which, in turn, provide access to one or more resources.

In various embodiments, the set of allowed access permissions data for the party of AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209 includes one or more account numbers which, in turn, provide access to one or more virtual assets and/or other resources within a cloud computing environment.

In various embodiments, the set of allowed access permissions data for the party of AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209 includes one or more account numbers which, in turn, provide the party the capability to instantiate, and/or boot-up, one or more instances and/or other virtual assets in a cloud computing environment.

In various embodiments, the set of allowed access permissions data for the party of AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209 includes secrets data required to access one or more resources.

As noted above, herein the term "secrets" includes any information, credentials, or other devices, necessary to protect, encrypt, and/or access, data, one or more resources, one or more virtual assets, and/or one or more computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to protect and control access to various systems, resources, file systems and any other persistent storage, and data, and that are required for such access, as discussed herein, and/or as known/available in the art at the time of filing, and/or as developed/made available after the time of filing.

In one embodiment, the secrets represented by the secrets data are of one or more types, or classifications, of secrets. In various embodiments, the secrets are classified according to the type of resource the secret is used to access. For example, usernames, passwords, and passphrases, necessary to access various applications would be classified as user account access secrets, while digital certificates associated with Secure Socket Layer (SSL) communications channels would be classified as communication secrets, and encryption keys would be classified as encryption secrets.

In addition, the secrets represented by the secrets data can be classified according to the level of security provided by the secrets. For instance encryption keys would be classified as secrets providing a relatively high level of security, with longer encryption keys being classified as secrets providing a higher level of security, while passwords might be classified as secrets providing a relatively moderate level of security, with longer and more diverse passwords being classified as secrets providing a relatively higher level of security.

In addition, the secrets represented by the secrets data can be classified according to whether the secrets provide access to internal resources, such as databases and data in a data center, or access to external resources such as services offered through a cloud or the Internet.

In one embodiment, the different types of secrets are provided by, and/or originate from, different secret sources. In one embodiment, the secrets data representing the different classes of secrets are maintained, at least initially, in separate secret databases, systems, or data stores, and/or in a master secrets database.

In one embodiment, once the employment role data associated with the party, the trust data associated with the party, and the special permissions data associated with the party, are automatically analyzed to determine a set of allowed access permissions data to be associated with the party at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209, process flow proceeds to RECOMMEND THE PARTY BE PROVIDED THE SET OF ALLOWED ACCESS PERMISSIONS DATA OPERATION 211.

In one embodiment, once the set of allowed access permissions data for the party is obtained/retrieved at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209 then a recommendation is made to one or more authorities within the organization to provide the set of allowed access permissions data for the party to the party, e.g., to an access system, and/or account, associated with the party, at RECOMMEND THE PARTY BE PROVIDED THE SET OF ALLOWED ACCESS PERMISSIONS DATA OPERATION 211.

In one embodiment, pending approval from the one or more authorities within organization at RECOMMEND THE PARTY BE PROVIDED THE SET OF ALLOWED ACCESS PERMISSIONS DATA OPERATION 211, the set of allowed access permissions data for the party is provided to the party, e.g., is provided to an access system, and/or account, associated with the party.

In one embodiment, once a recommendation is made to one or more authorities within the organization to provide the set of allowed access permissions data for the party to the party, e.g., to an access system, and/or account, associated with the party, at RECOMMEND THE PARTY BE PROVIDED THE SET OF ALLOWED ACCESS PERMISSIONS DATA OPERATION 211, process flow proceeds to EXIT OPERATION 230.

In one embodiment, at EXIT OPERATION 230 process 200 for dynamically and automatically managing resource access permissions is exited to await new data.

Using process 200 for dynamically and automatically managing resource access permissions, employment role data associated with a party, trust data associated with a party, and special permissions data associated with a party, is obtained and analyzed to determine a set of allowed access permissions data for a party in a highly automated, efficient, and consistent manner so there is less opportunity for security gaps, human error, and inefficient and ineffective use of resources.

In another, more automated, embodiment, once the set of allowed access permissions data for the party is obtained/retrieved, the set of allowed access permissions data for the party is automatically provided to the party, e.g., is provided to an access system, and/or account, associated with the party, without any further approval or input.

In accordance with one embodiment, a method and system for dynamically and automatically managing resource access permissions includes automatically obtaining and/or monitoring employment role data associated with a party. In one embodiment, the employment role data associated with the party includes data indicating the party's role and/or job description within an organization managing access to resources associated with the organization.

In one embodiment, trust data associated with the party is automatically obtained and/or monitored. In one embodiment, the trust data associated with the party includes data indicating the party's trust related activities and/or a trust level/trust score assigned to the party.

In one embodiment, special permissions data associated with the party is automatically obtained and/or monitored. In one embodiment, the special permissions data associated with the party includes data indicating any special resource access permissions granted to the party.

In one embodiment, the employment role data associated with the party, the trust data associated with the party, and the special permissions data associated with the party, is then analyzed periodically to determine a set of allowed access permissions data to be associated with the party, the set of allowed access permissions data providing the party access to one or more resources. In one embodiment, the set of allowed access permissions data is then automatically provided to the party.

Figure 3:
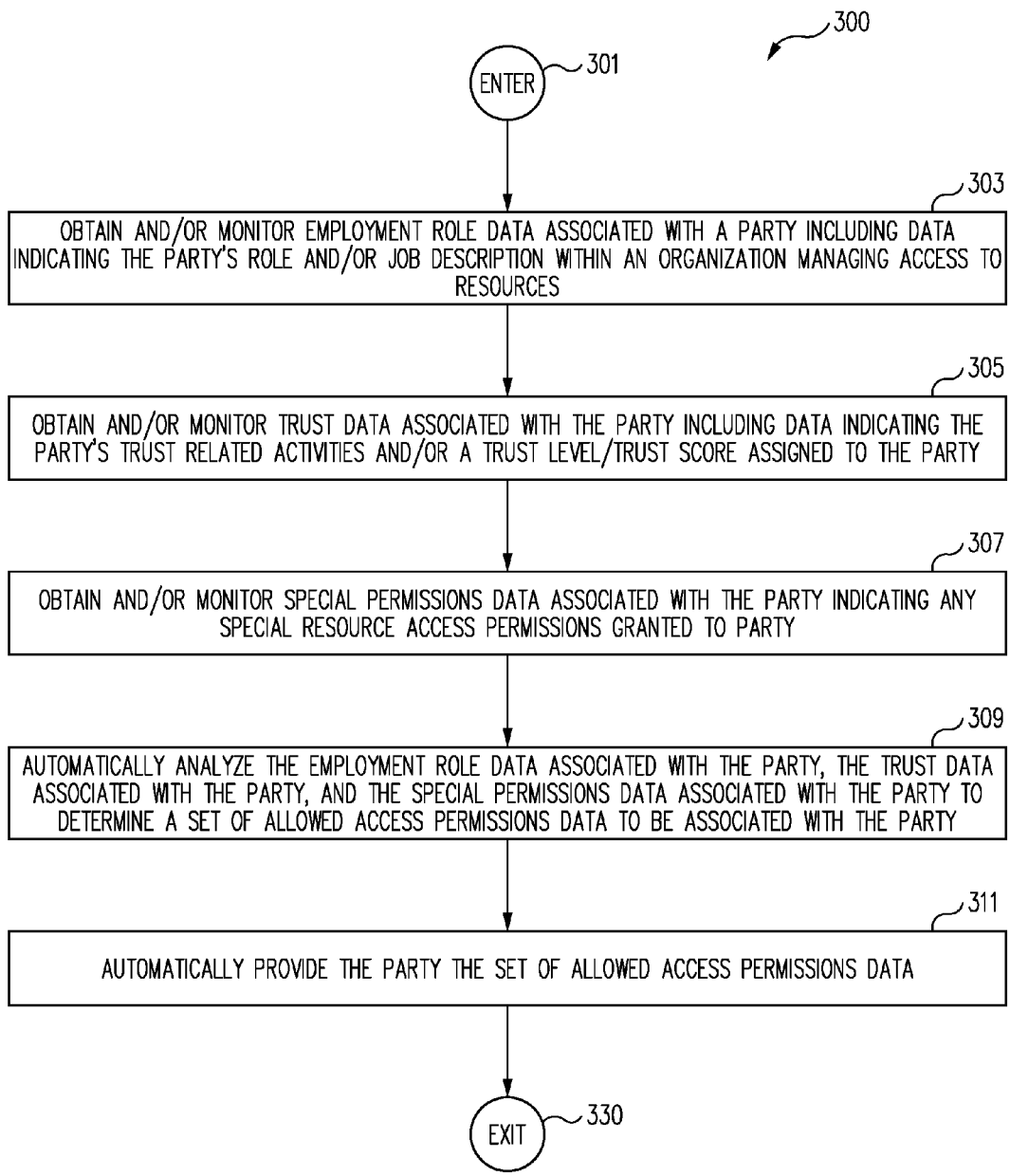
FIG. 3 is a flow chart depicting a process for dynamically and automatically managing resource access permissions in accordance with one embodiment.

FIG. 3 is a flow chart of a process 300 for dynamically and automatically managing resource access permissions in accordance with one embodiment. In one embodiment, process 300 for dynamically and automatically managing resource access permissions begins at ENTER OPERATION 301 of FIG. 3 and process flow proceeds to OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 303.

In one embodiment, OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 303; OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 305; OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 307; and AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 309 of process 300 for dynamically and automatically managing resource access permissions are substantially identical to OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203; OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205; OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 207; and AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 209 of process 200 for dynamically and automatically managing resource access permissions.

Consequently, the reader is referred to the discussion above of process 200 for dynamically and automatically managing resource access permissions for a more detailed description of OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 303; OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 305; OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 307; and AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 309 of process 300 for dynamically and automatically managing resource access permissions.

In one embodiment, once the employment role data associated with the party of OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 303, the trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 305, and the special permissions data associated with the party of OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 307, are automatically analyzed to determine a set of allowed access permissions data to be associated with the party at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 309, process flow proceeds to AUTOMATICALLY PROVIDE THE PARTY THE SET OF ALLOWED ACCESS PERMISSIONS DATA OPERATION 311.

In one embodiment, at AUTOMATICALLY PROVIDE THE PARTY THE SET OF ALLOWED ACCESS PERMISSIONS DATA OPERATION 311 the set of allowed access permissions data for the party is automatically provided to the party, e.g., is provided to an access system, and/or account, associated with the party, without any further approval or input.

In another, more automated, embodiment, if the party requests access to a resource for which the party does not currently have the required permissions data, the employment role data associated with the party, the trust data associated with the party, and the special permissions data associated with the party, are automatically analyzed at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCESS PERMISSIONS DATA TO BE ASSOCIATED WITH THE PARTY OPERATION 309 to determine if the party should be provided the required permissions data, and if a determination is made that the party should be provided the required permissions data, the party is automatically provided the required permissions data at AUTOMATICALLY PROVIDE THE PARTY THE SET OF ALLOWED ACCESS PERMISSIONS DATA OPERATION 311.

In various embodiments, this analysis and provision of permissions data is based on the historical "track record" of the party with respect to the organization and represents a level of automation requiring little or no organizational input beyond establishing the initial operating parameters.

In one embodiment, once the set of allowed access permissions data for the party is automatically provided to the party, e.g., is provided to an access system, and/or account, associated with the party, without any further approval or input at AUTOMATICALLY PROVIDE THE PARTY THE SET OF ALLOWED ACCESS PERMISSIONS DATA OPERATION 311, process flow proceeds to EXIT OPERATION 330.

In one embodiment, at EXIT OPERATION 330 process 300 for dynamically and automatically managing resource access permissions is exited to await new data.

Using process 300 for dynamically and automatically managing resource access permissions, employment role data associated with a party, trust data associated with a party, and special permissions data associated with a party, is obtained and analyzed to determine a set of allowed access permissions data for a party in a highly automated, efficient, and consistent manner so there is less opportunity for security gaps, human error, and inefficient and ineffective use of resources.

In one embodiment, the permissions data includes account numbers used to access and/or control various resources, including, in one embodiment, virtual assets instantiated in a cloud-computing environment.

In accordance with one embodiment, a process for dynamically and automatically managing resource access permissions includes automatically obtaining and/or monitoring employment role data associated with a party. In one embodiment, the employment role data associated with the party includes data indicating the party's role and/or job description within an organization managing access to resources associated with the organization.

In one embodiment, trust data associated with the party is automatically obtained and/or monitored. In one embodiment, the trust data associated with the party includes data indicating the party's trust related activities and/or a trust level/trust score assigned to the party.

In one embodiment, special permissions data associated with the party is automatically obtained and/or monitored. In one embodiment, the special permissions data associated with the party includes data indicating any special resource access permissions granted to the party.

In one embodiment, the employment role data associated with the party, the trust data associated with the party, and the special permissions data associated with the party, is then analyzed periodically to determine a set of allowed account numbers to be associated with the party, the set of allowed account numbers providing the party access to one or more resources in a cloud computing environment.

In one embodiment, it is then either recommended that the set of allowed account numbers be provided to the party, or the set of allowed account numbers is automatically provided to the party.

Figure 4:
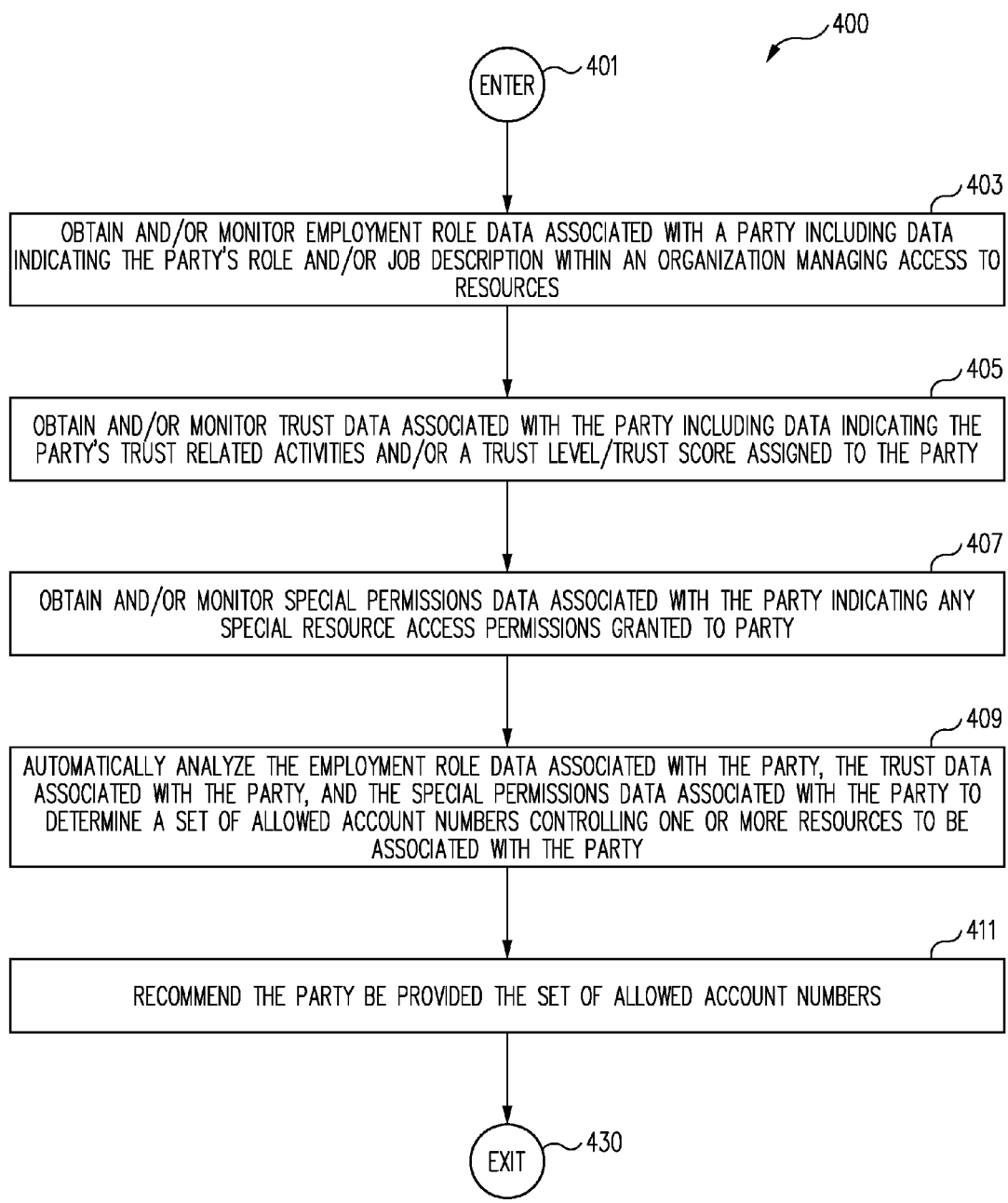
FIG. 4 is a flow chart depicting a process for dynamically and automatically managing resource access permissions in accordance with one embodiment.

FIG. 4 is a flow chart of a process 400 for dynamically and automatically managing resource access permissions in accordance with one embodiment. In one embodiment, process 400 for dynamically and automatically managing resource access permissions begins at ENTER OPERATION 401 of FIG. 4 and process flow proceeds to OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 403.

In various embodiments, OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 403; OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 405; and OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 407 of process 400 for dynamically and automatically managing resource access permissions are substantially identical to OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 203; OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 205; and OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 207 of process 200 for dynamically and automatically managing resource access permissions.

Consequently, the reader is referred to the discussion above of process 200 for dynamically and automatically managing resource access permissions for a more detailed description of OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 403; OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 405; and OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 407 of process 400 for dynamically and automatically managing resource access permissions.

In one embodiment, once special permissions data associated with the party is obtained and/or monitored at OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 407, process flow proceeds to AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCOUNT NUMBERS CONTROLLING ONE OR MORE RESOURCES IN A CLOUD COMPUTING ENVIRONMENT TO BE ASSOCIATED WITH THE PARTY OPERATION 409.

In one embodiment, at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCOUNT NUMBERS CONTROLLING ONE OR MORE RESOURCES TO BE ASSOCIATED WITH THE PARTY OPERATION 409 the employment role data associated with the party of OBTAIN AND/OR MONITOR EMPLOYMENT ROLE DATA ASSOCIATED WITH A PARTY INCLUDING DATA INDICATING THE PARTY'S ROLE AND/OR JOB DESCRIPTION WITHIN AN ORGANIZATION MANAGING ACCESS TO RESOURCES OPERATION 403, the trust data associated with the party of OBTAIN AND/OR MONITOR TRUST DATA ASSOCIATED WITH THE PARTY INCLUDING DATA INDICATING THE PARTY'S TRUST RELATED ACTIVITIES AND/OR A TRUST LEVEL/TRUST SCORE ASSIGNED TO THE PARTY OPERATION 405, and the special permissions data associated with the party of OBTAIN AND/OR MONITOR SPECIAL PERMISSIONS DATA ASSOCIATED WITH THE PARTY INDICATING ANY SPECIAL RESOURCE ACCESS PERMISSIONS GRANTED TO THE PARTY OPERATION 407, are automatically analyzed to determine a set of allowed account numbers to be associated with the party, the set of allowed account numbers for the party providing the party access to one or more resources.

In one embodiment, the employment role data associated with the party, the trust data associated with the party, and the special permissions data associated with the party, is analyzed at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCOUNT NUMBERS CONTROLLING ONE OR MORE RESOURCES TO BE ASSOCIATED WITH THE PARTY OPERATION 409 to determine a set of allowed account numbers to be associated with the party at regularly scheduled time intervals.

For instance, in various embodiments, the employment role data associated with the party, the trust data associated with the party, and the special permissions data associated with the party, is analyzed at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCOUNT NUMBERS CONTROLLING ONE OR MORE RESOURCES TO BE ASSOCIATED WITH THE PARTY OPERATION 409 to determine a set of allowed account numbers to be associated with the party on a weekly, monthly, quarterly, or annual basis, and/or at any other time interval defined and/or desired.

In one embodiment, the employment role data associated with the party, the trust data associated with the party, and the special permissions data associated with the party, is analyzed at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCOUNT NUMBERS CONTROLLING ONE OR MORE RESOURCES TO BE ASSOCIATED WITH THE PARTY OPERATION 409 to determine a set of allowed account numbers to be associated with the party after each evaluation and/or review of the party, and/or upon the transfer of the party, and/or upon promotion or demotion of the party.

In one embodiment, the employment role data associated with the party, the trust data associated with the party, and the special permissions data associated with the party, is analyzed at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCOUNT NUMBERS CONTROLLING ONE OR MORE RESOURCES TO BE ASSOCIATED WITH THE PARTY OPERATION 409 to determine a set of allowed account numbers to be associated with the party whenever there is a threshold change in any of the employment role data, trust data, and/or special permissions data, associated with the party.

In one embodiment, based on the results of the analysis of the employment role data associated with the party, the trust data associated with the party, and the special permissions data associated with the party, of AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCOUNT NUMBERS CONTROLLING ONE OR MORE RESOURCES TO BE ASSOCIATED WITH THE PARTY OPERATION 409 a set of allowed account numbers for the party to be associated with the party is obtained/retrieved.

In various embodiments, the set of allowed account numbers for the party of AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCOUNT NUMBERS CONTROLLING ONE OR MORE RESOURCES TO BE ASSOCIATED WITH THE PARTY OPERATION 409 provides the party with access to one or more resources.

As noted above, herein, the term "resource" refers to any software or hardware entity or component. As one specific illustrative example, in one embodiment, the term resources includes any virtual asset implemented in a cloud computing environment.

As used herein, the term "virtual asset" includes any virtualized entity or resource, and/or a part of an actual, or "bare metal" entity. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In other embodiments, a resource can include one or more components or systems deployed in a data center; one or more physical or virtual server computing systems; one or more physical or virtual workstations; one or more database systems or storage clusters; one or more switching systems; one or more routers; any hardware system; any communications systems; any form of proxy system; one or more gateway systems; one or more firewall systems; one or more load balancing systems; one or more applications and/or services; and/or any other software or hardware entity, or entities, capable of transmitting and/or receiving data as discussed herein, and/or as known in the art at the time of filing, and/or as developed/made available after the time of filing.

In various embodiments, the set of allowed account numbers for the party of AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCOUNT NUMBERS CONTROLLING ONE OR MORE RESOURCES TO BE ASSOCIATED WITH THE PARTY OPERATION 409 includes one or more account numbers which, in turn, provide access to one or more virtual assets and/or other resources within a cloud computing environment.

In various embodiments, the set of allowed account numbers for the party of AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCOUNT NUMBERS CONTROLLING ONE OR MORE RESOURCES TO BE ASSOCIATED WITH THE PARTY OPERATION 409 includes one or more account numbers which, in turn, provide the party the capability to instantiate, and/or boot-up, one or more instances and/or other virtual assets in a cloud computing environment.

In one embodiment, once the employment role data associated with the party, the trust data associated with the party, and the special permissions data associated with the party, are automatically analyzed to determine a set of allowed account numbers to be associated with the party, the set of allowed account numbers for the party providing the party access to one or more resources at AUTOMATICALLY ANALYZE THE EMPLOYMENT ROLE DATA ASSOCIATED WITH THE PARTY, THE TRUST DATA ASSOCIATED WITH THE PARTY, AND THE SPECIAL PERMISSIONS DATA ASSOCIATED WITH THE PARTY, TO DETERMINE A SET OF ALLOWED ACCOUNT NUMBERS CONTROLLING ONE OR MORE RESOURCES TO BE ASSOCIATED WITH THE PARTY OPERATION 409, process flow proceeds to RECOMMEND THE PARTY BE PROVIDED THE SET OF ALLOWED ACCOUNT NUMBERS OPERATION 411.

In one embodiment, once the set of allowed account numbers for the party is obtained/retrieved, a recommendation is made to one or more authorities within the organization to provide the set of allowed account numbers for the party to the party, e.g., to an access system, and/or account, associated with the party, at RECOMMEND THE PARTY BE PROVIDED THE SET OF ALLOWED ACCOUNT NUMBERS OPERATION 411.

In one embodiment, pending approval from the one or more authorities within organization, the set of allowed account numbers for the party is provided to the party, e.g., is provided to an access system, and/or account, associated with the party, at RECOMMEND THE PARTY BE PROVIDED THE SET OF ALLOWED ACCOUNT NUMBERS OPERATION 411.

In another, more automated, embodiment, once the set of allowed account numbers for the party is obtained/retrieved, the set of allowed account numbers for the party is automatically provided to the party, e.g., is provided to an access system, and/or account, associated with the party, without any further approval or input at RECOMMEND THE PARTY BE PROVIDED THE SET OF ALLOWED ACCOUNT NUMBERS OPERATION 411.

In another, more automated, embodiment, if the party requests access to a resource for which the party does not currently have the required account numbers, the employment role data associated with the party, the trust data associated with the party, and the special permissions data associated with the party, are automatically analyzed to determine if the party should be provided the required account numbers, and if a determination is made that the party should be provided the required account numbers, the party is automatically provided the required account numbers. In various embodiments, this analysis and provision of account numbers is based on the historical "track record" of the party with respect to the organization and represents a level of automation requiring little or no organizational input beyond establishing the initial operating parameters.

In one embodiment, once the set of allowed account numbers for the party is obtained/retrieved, and a recommendation is made to one or more authorities within the organization to provide the set of allowed account numbers for the party to the party, or the set of allowed account numbers is automatically provide to the party at RECOMMEND THE PARTY BE PROVIDED THE SET OF ALLOWED ACCOUNT NUMBERS OPERATION 411, process flow proceeds to EXIT OPERATION 430.

In one embodiment, at EXIT OPERATION 430 process 400 for dynamically and automatically managing resource access permissions is exited to await new data.

Using process 400 for dynamically and automatically managing resource access permissions, employment role data associated with a party, trust data associated with a party, and special permissions data associated with a party, is obtained and analyzed to determine a set of allowed account numbers for a party in a highly automated, efficient, and consistent manner so there is less opportunity for security gaps, human error, and inefficient and ineffective use of resources.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for dynamically and automatically managing resource access permissions comprising:
    at least one processor; and
    at least one memory coupled to the at least one processor, the at least one memory having stored therein instructions which when executed by any set of the one or more processors, perform a process for dynamically and automatically managing resource access permissions, the process for dynamically and automatically managing resource access permissions including:
    automatically obtaining and monitoring employment role data associated with a party, the employment role data associated with the party including data indicating the party's role and/or job description within an organization;
    automatically obtaining and monitoring trust data associated with the party, the trust data associated with the party including data indicating the party's trust related activities and a trust level/trust score assigned to the party,
    wherein the trust data includes internal trust data associated with the party and that is obtained by monitoring interactions of the party with one or more resources within the organization,
    wherein the trust data includes external trust data associated with the party and that is obtained by monitoring interactions of the party with one or more resources outside of the organization;

automatically obtaining and monitoring special permissions data associated with the party, the special permissions data associated with the party indicating any special resource access permissions granted to the party, the special resource access permissions being resource access permissions granted on a temporary basis to the party and that are outside a scope of the other permissions granted to the party based on the employment role of the party and/or the trust level/trust score assigned to the party;

automatically analyzing the employment role data associated with the party, the trust data associated with the party, and the special permissions data associated with the party, to determine a set of allowed access permissions data to be associated with the party;

applying the set of allowed access permissions data to an account associated with the party, the allowed access permissions data indicating the party is allowed access to one or more resources that provide services for the organization, the one or more resources that provide services for the organization including one or more virtual assets configured to host services for the organization, the one or more virtual assets including one or more virtual server instances that provide the services for the organization to customers of the organization from an untrusted cloud computing environment, the set of allowed access permissions data enabling the party to instantiate the one or more virtual server instances that provide the services for the organization to customers of the organization from the untrusted cloud computing environment, the untrusted cloud computing environment including hardware infrastructure that is allocated under the control of a cloud environment service provider for use by the organization and that is not allocated under the control of the organization, to provide the services to the customers of the organization; and automatically providing the party access to the one or more resources that provide services for the organization at least partially based on the set of allowed access permissions data, to enable the party to instantiate the one or more virtual server instances in the untrusted cloud computing environment, to securely migrate the services for the organization to the untrusted cloud computing environment.

2. The system for dynamically and automatically managing resource access permissions of claim 1 wherein at least part of the employment role data associated with the party includes employment role data selected from the group of employment role data consisting of:
job description data indicating the party's job within the organization, and/or resources access required by the job indicated in job description data;
manager access request data indicating resources access the party's manager desires to provide the party;
human resources data indicating the party's work history with the organization; and
any combination thereof.

3. The system for dynamically and automatically managing resource access permissions of claim 1 wherein at least part of the trust data associated with the party includes trust data associated with the party selected from the group of trust data associated with the party consisting of:
security trust data associated with the party indicating the party's use and management of secrets data and adherence to security procedures;
financial trust data associated with the party; and
any combination thereof.

4. The system for dynamically and automatically managing resource access permissions of claim 1 wherein at least part of the internal trust data associated with the party includes internal trust data selected from the group of internal trust data consisting of:
the party's history of attempted access to resources for which the party did not have the required permissions;
responsiveness of the party with respect to security and/or data entry requests;
the party's history of Internet access from the organization's equipment;
the party's history of Internet access during the party's working hours;
the party's history of cloud-based resources access using the organization's equipment;
the party's history of cloud-based resources access during the party's working hours;
the party's history of cloud-based resources access during the party's non-working hours;
the party's compliance with one or more employment policies; and
any combination thereof.

5. The system for dynamically and automatically managing resource access permissions of claim 1 wherein at least part of the external trust data associated with the party includes external trust data selected from the group of external trust data consisting of:
data obtained from one or more external websites associated with the party;
data obtained from one or more accounts with one or more social media websites associated with the party;
data obtained from a web browser used by the party;
historical geographic locations data associated with the party;
data obtained from one or more phones associated with the party;
data obtained from one or more computing systems associated with the party; and
any combination thereof.

6. The system for dynamically and automatically managing resource access permissions of claim 3 wherein at least part of the security trust data associated with the party includes security trust data selected from the group of security trust data consisting of:
data indicating the strength of passwords used by the party;
data indicating whether the passwords used by the party conform to a password policy of the organization;
data indicating how often the party changes/rotates their passwords;
data indicating whether the passwords used by the party are changed/rotated in accordance with a password policy of the organization;
data indicating whether the party's handling of secrets and access data conforms to a security policy of the organization;
data indicating the responsiveness of the party to requests for data and/or action by the party with respect to security; and
any combination thereof.

7. The system for dynamically and automatically managing resource access permissions of claim 3 wherein at least part of the trust data includes human resources trust data associated with the party that is selected from a group of human resources trust data consisting of:
the length of employment of the party by the organization;

the advancement of the party within the organization as compared with similarly situated parties within the organization;
employee review/evaluation data associated with the party;
the employment history of the party; and
any combination thereof.

8. The system for dynamically and automatically managing resource access permissions of claim 3 wherein at least part of the financial trust data associated with the party includes financial trust data selected from the group of financial trust data consisting of:
 financial data associated with the party obtained from public sources;
 financial data associated with the party obtained from private sources;
 financial data associated with the party obtained from the party;
 and any combination thereof.

9. The system for dynamically and automatically managing resource access permissions of claim 1 wherein at least part of the special permissions data associated with the party is selected from the group of special permissions data associated with the party consisting of:
 alert related permissions data;
 project permissions data;
 manager permissions data;
 temporary permissions data;
 and any combination thereof.

10. The system for dynamically and automatically managing resource access permissions of claim 1 wherein the employment role data associated with the party, the trust data associated with the party, and the special permissions data associated with the party, is analyzed to determine a set of allowed access permissions data to be associated with the party at regularly scheduled time intervals.

11. The system for dynamically and automatically managing resource access permissions of claim 1 wherein the employment role data associated with the party, the trust data associated with the party, and the special permissions data associated with the party, is analyzed to determine a set of allowed access permissions data to be associated with the party whenever there is a threshold change in any of the employment role data, trust data, and/or special permissions data, associated with the party.

12. The system for dynamically and automatically managing resource access permissions of claim 1 wherein the set of allowed access permissions data for the party includes instantiation, and/or boot-up, data associated with one or more virtual assets.

13. The system for dynamically and automatically managing resource access permissions of claim 1 wherein the set of allowed access permissions data for the party includes one or more account numbers associated with one or more resources.

14. The system for dynamically and automatically managing resource access permissions of claim 13 wherein the one or more resources are selected from the group of resources consisting of:
 a virtual machine;
 a virtual server;
 a database or data store;
 an instance in a cloud environment;
 a cloud environment access system;
 part of a mobile device;
 part of a remote sensor;
 part of a laptop computing system;
 part of a desktop computing system;
 part of a point-of-sale computing system; and
 part of an ATM.

15. The system for dynamically and automatically managing resource access permissions of claim 1 wherein the set of allowed access permissions data for the party includes secrets data required to access one or more resources.

16. The system for dynamically and automatically managing resource access permissions of claim 15 wherein the one or more resources are selected from the group of resources consisting of:
 a virtual machine;
 a virtual server;
 a database or data store;
 an instance in a cloud environment;
 a cloud environment access system;
 part of a mobile device;
 part of a remote sensor;
 part of a laptop computing system;
 part of a desktop computing system;
 part of a point-of-sale computing system; and
 part of an ATM.

17. A system for dynamically and automatically managing resource access permissions comprising:
 at least one processor, and
 at least one memory coupled to the at least one processor, the at least one memory having stored therein instructions which when executed by any set of the one or more processors, perform a process for dynamically and automatically managing resource access permissions, the process for dynamically and automatically managing resource access permissions including:
 automatically obtaining and monitoring employment role data associated with a party, the employment role data associated with the party including data indicating the party's role and/or job description within an organization;
 automatically obtaining and monitoring trust data associated with the party, the trust data associated with the party including data indicating the party's trust related activities and a trust level/trust score assigned to the party,
 wherein the trust data includes internal trust data associated with the party and that is obtained by monitoring interactions of the party with one or more resources within the organization,
 wherein the trust data includes external trust data associated with the party and that is obtained by monitoring interactions of the party with one or more resources outside of the organization,
 wherein the external trust data is also obtained from one or more external websites used by the party for non-work-related activities, at least part of the external trust data associated with the party includes data associated with the party obtained from one or more social media websites accessed by the party;
 automatically obtaining and monitoring special permissions data associated with the party, the special permissions data associated with the party indicating any special resource access permissions granted to the party;
 automatically analyzing the employment role data associated with the party, the trust data associated with the party, and the special permissions data associated with the party, to determine a set of allowed access permissions data to be associated with the party;
 applying the set of allowed access permissions data to an account associated with the party, the allowed access permissions data indicating the party is allowed access to one or more resources that provide services for the organization, the one or more resources that provide services for the organization including one or more virtual assets configured to host services for the organization, the one or more virtual assets including one or more virtual server instances that provide the services for the organization to customers of the organization from an untrusted cloud computing environment, the set of allowed access permissions data enabling the party to instantiate the one or more virtual server instances that provide the services for the organization to customers of the organization from the untrusted cloud computing environment, the untrusted cloud computing environment including hardware infrastructure that is allocated under the control of a cloud environment service provider for use by the organization and that is not allocated under the control of the organization, to provide the services to the customers of the organization; and automatically providing the party access to one or more resources that provide services for the organization at least partially based on the set of allowed access permissions data, to enable the party to instantiate the one or more virtual server instances in the untrusted cloud computing environment, to securely migrate the services for the organization to the untrusted cloud computing environment.

18. A system for dynamically and automatically managing resource access permissions comprising:

at least one processor; and at least one memory coupled to the at least one processor, the at least one memory having stored therein instructions which when executed by any set of the one or more processors, perform a process for dynamically and automatically managing resource access permissions, the process for dynamically and automatically managing resource access permissions including:

automatically obtaining and monitoring employment role data associated with a party, the employment role data associated with the party including data indicating the party's role and/or job description within an organization;

automatically obtaining and monitoring trust data associated with the party, the trust data associated with the party including data indicating the party's trust related activities and a trust level/trust score assigned to the party, wherein the trust data includes internal trust data associated with the party and that is obtained by monitoring interactions of the party with one or more resources within the organization, the trust data including human resources trust data associated with the party and indicating the party's employment and advancement record within the organization, wherein the trust data includes external trust data associated with the party and that is obtained by monitoring interactions of the party with one or more resources outside of the organization;

automatically obtaining and monitoring special permissions data associated with the party, the special permissions data associated with the party indicating any special resource access permissions granted to the party;

automatically analyzing the employment role data associated with the party, the trust data associated with the party, and the special permissions data associated with the party, to determine a set of allowed access permissions data to be associated with the party;

applying the set of allowed access permissions data to an account associated with the party, the allowed access permissions data indicating the party is allowed access to one or more resources that provide services for the organization, the one or more resources that provide services for the organization including one or more virtual assets configured to host services for the organization, the one or more virtual assets including one or more virtual server instances that provide the services for the organization to customers of the organization from an untrusted cloud computing environment, the set of allowed access permissions data enabling the party to instantiate the one or more virtual server instances that provide the services for the organization to customers of the organization from the untrusted cloud computing environment, the untrusted cloud computing environment including hardware infrastructure that is allocated under the control of a cloud environment service provider for use by the organization and that is not allocated under the control of the organization, to provide the services to the customers of the organization; and automatically providing the party access to one or more resources that provide services for the organization at least partially based on the set of allowed access permissions data, to enable the party to instantiate the one or more virtual server instances in the untrusted cloud computing environment, to securely migrate the services for the organization to the untrusted cloud computing environment.

\* \* \* \* \*